United States Patent [19]

Stoll

[11] Patent Number: 4,679,452

[45] Date of Patent: Jul. 14, 1987

[54] LIMIT SENSING DEVICE

[76] Inventor: Kurt Stoll, Lenzhalde 72, 7300 Esslingen, Fed. Rep. of Germany

[21] Appl. No.: 892,732

[22] Filed: Jul. 29, 1986

Related U.S. Application Data

[63] Continuation of Ser. No. 609,295, May 11, 1984, abandoned.

[30] Foreign Application Priority Data

May 17, 1983 [DE] Fed. Rep. of Germany ....... 3317888

[51] Int. Cl.$^4$ ........................ F01B 25/26; F16H 21/44

[52] U.S. Cl. ...................................... 74/110; 74/99 R; 92/5 R; 200/153 T

[58] Field of Search ........................... 92/5 R, 5 L, 59; 200/6 A, 153 T, 339; 74/99 R, 110

[56] References Cited

U.S. PATENT DOCUMENTS

| | | | |
|---|---|---|---|
| 1,478,929 | 12/1923 | Tursky | 92/5 |
| 1,828,059 | 10/1931 | Meuer | 200/339 |
| 3,003,473 | 10/1961 | Ottoson | 92/5 R |
| 3,047,682 | 7/1962 | Hults | 200/339 |
| 3,115,555 | 12/1963 | Lescarboura | 200/153 T |
| 3,146,330 | 8/1964 | Miller | 200/339 |
| 3,414,693 | 12/1968 | Watson | 92/5 R |
| 3,569,655 | 3/1971 | Jakubauskas | 200/153 T |
| 3,722,371 | 3/1973 | Boyle | 92/5 R |
| 3,835,753 | 9/1974 | Bunyard | 92/5 R |
| 4,162,386 | 7/1979 | Bourgeois | 200/339 |

FOREIGN PATENT DOCUMENTS

| | | | |
|---|---|---|---|
| 715739 | 1/1942 | Fed. Rep. of Germany | 92/5 R |
| 1048712 | 11/1966 | United Kingdom | 92/5 R |
| 2094553 | 9/1982 | United Kingdom | 200/339 |

*Primary Examiner*—Abraham Hershkovitz
*Attorney, Agent, or Firm*—McGlew and Tuttle

[57] ABSTRACT

A mechanical limit sensing device or limit switch for piston and cylinder actuators has a housing in which a rocking lever is pivoted so that its one end is moved by part of the actuator to be controlled. The other end works a switching element. The housing is made in two parts, that is to say on the one hand a bush or bearing sleeve and on the other hand a gripping or clamping body for the bush. The bush may be turned in the body and may be clamped in it in a given position. The lever has a ball-like part with which it is mounted in a socket in the bush. The lever is furthermore guided in a slot in the body. This slot furthermore divides part of the body into two jaws that are used for clamping the body onto the bush. The switching element is screwed into a hole in the body that is in the same plane as the slot. There is furthermore a blind hole in this plane to take up a plunger for returning the lever after being actuated.

7 Claims, 2 Drawing Figures

LIMIT SENSING DEVICE

This application is a continuation of application Ser. No. 609,295, filed May 11, 1984, now abandoned

BACKGROUND OF THE INVENTION

The present invention relates to mechanical limit sensing devices for piston and cylinder actuators and comprising a lever whose one end is operated by being struck by a mass moving along a given path, and whose other end works a switching element, the lever being pivoted somewhere between its ends in a lever housing.

DISCUSSION OF THE PRIOR ART

Such limit sensing devices have made it possible for the moving part of a piston and cylinder actuator to be moved accurately to one of a number of desired points as may be needed. The fact that the moving part has moved as far as the desired point may be made clear, for example by way of a visible indicator. Such limit sensing devices are frequently furthermore used for the control of piston and cylinder actuators, more specially for reversing their direction of motion. To this end a signal produced by the limit sensing device may control a valve system, which in turn controls the drive ducts for the piston and cylinder actuator.

Known limit sensing devices are currently used on an ever increasing scale in the form of magnetic or induction proximity switches. And in one example the moving part of the piston and cylinder actuator may be fitted with one or more permanent magnets for use with a magnetic detector, as for example a Hall element or a reed switch, placed next to the path of motion of the magnet so that its worked by the stray field thereof. In the case of inductive proximity switches the system is generally similar but for the fact that an electromagnetic oscillator is placed next to the path of motion of the piston cylinder actuator so that when a metal part thereof is moved past the oscillator, the energy radiated by it will be damped by eddy current effects and such damping works a trigger circuit whose output signal is then used for control purposes. Such magnetic and inductive limit switches or devices work without making mechanical contact with the part monitored, highly accurately and with a high degree of reliability. However they do have a number of shortcomings. First of all, they are relatively expensive to manufacture. Secondly the output signal is such that it may only be used for driving an electrical circuit (and not directly for driving an electro-mechanical system) and the manufacture of such circuits is itself expensive, and furthermore there may be some trouble in arranging a power supply for it. Lastly, magnetic and inductive limit sensing devices are mechanically sensitive and may well be damaged or respond differently when acted upon by powerful vibrations, impacts or the like so that electrical or electronic limit sensing devices may not well be used for such applications.

For these reasons a suggestion has been made in the past (see the German Gebrauchsmuster U.S. Pat. No. 7,234,087) of the sort in question here, in which the rocking lever is moved by the piston acting by way of a plunger guided in the housing of the limit sensing device so that a multi-way valve, that is mounted directly in the housing, may be worked by the lever. However the parts of such a system have to be functionally interconnected and the mechanical design has to be complex so that troubles with the seals are likely and furthermore it is not possible for the device to be customized for example with respect to the amount of space needed, the switching point or stroke length and the frequency of operation.

SHORT OVERVIEW OF THE PRESENT INVENTION

On the other hand one purpose or object of the present invention is to design a limit sensing device that works purely mechanically.

A further object of the invention is to design such a device that may be dismounted as a self-contained unit.

A still further purpose of the invention is to develop such a unit that, while on the one hand being very dependable in function, may be highly adaptably modified for or fitted to the different models of known piston and cylinder actuators.

As a still further aim the present invention is to make it possible for such a limit sensing device to be readily adjusted with respect to its switching or actuation point without any sort of change being necessary on the piston and cylinder unit itself.

For effecting these and further objects that will be seen from the account herein, in the invention a mechanical limit sensing device has its housing in the form of a bearing sleeve or bush and of a gripping or clamping body, that is able to be turned on the bush and locked in position, and which furthermore is cut into two gripping jaws by a slot, such jaws being able to be seated on a collar on the bush, the lever being positively guided in the slot and the bush having an axial hole forming a ball socket for taking up a ball head on the lever.

This new form of limit sensing device is such that it may be used for direct operation of pneumatic, electrical or mechanical switching elements or circuits so that there is a free choice with respect to the information transmission medium for the limit signal. The limit sensing device of the present invention is furthermore characterized by a dependable mode of operation, by a very space saving design and by simple and cheap manufacture. More specifically however the new limit sensing device of the invention may be very readily adapted to the different known designs and models of piston and cylinder actuator, for example by twisting and setting the gripping body and by screwing the housing to a greater or lesser degree into the cylinder wall so that the switching or trip point of the device may be very simply adjusted.

Further useful effects of the invention will be seen from the account now to be given of one working example thereof using the figures herein.

DESCRIPTION OF THE PREFERRED EMBODIMENT

Figure 1:
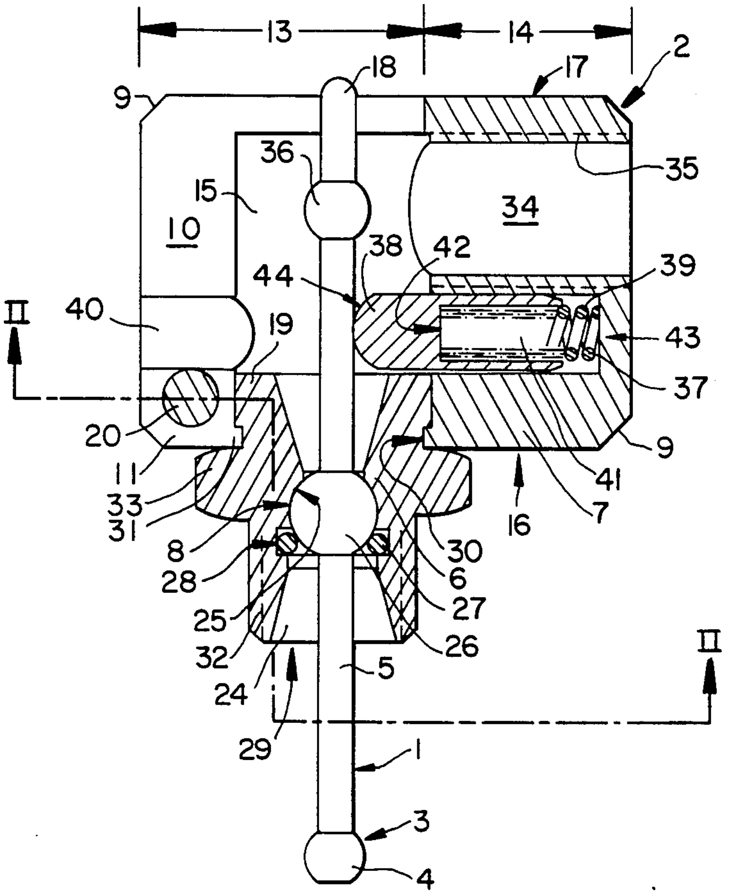
FIG. 1 is a lengthwise section taken through a limit sensing device or limit switch on the line I—I of FIG. 2.

Turning first to FIG. 1, that is a view of a mechanical limit switch or limit sensing device for use with hydraulic or pneumatic piston and cylinder actuators, it will be seen that there is a main driving part in the form of a rocking lever 1. This lever 1 is pivotally mounted in a housing 2, that has a driven switch element (not marked) to be controlled and a lever returning means (mainly spring 37, see account further below). The lever 1 has one end 3 running out of the housing 2. This end 3 may be acted upon by a mass, that is guided along a given path, so that the lever 1 is rocked somewhat and the driving element to be controlled is then moved as a signal that the mass has gone as far to its limit or end position. The mass guided along a given path will generally be the moving part of a piston and cylinder actuator, that is to say either the piston or the cylinder thereof (or in some cases a driving dog fitted on the piston or the cylinder). The point at which the guided mass strikes the lever 1 is best designed as a driving head 4 (see FIG. 1) having a rounded or partly spherical form and sticking out clear of the lever 1 on all sides. In keeping with FIG. 1 it will be seen that the lever 1 is in the form of a round bar with a stem 5 of round cross section and the driving head 4 is in the form of a ball with a radial hole therein so that the stem 5 may be force fitted into such round, radial hole and the head 4 locked in place. In addition to useful effects in connection with manufacture, this design makes it possible for the point of contact or striking of the guided mass to be adjusted in level to some degree. However in the interests of making the lever arm as long as possible, the driving head 4 is best placed at the end 3 of the lever 1.

The housing 2 supporting the lever 1 therein is in the invention made up of a bush or sleeve 6 and a gripping or clamping body 7 that may be mounted thereon.

The gripping body 7 may be turned on the bush 6 through 360° and locked in certain positions of angle. The lever 1 is bearinged or pivoted in a ball socket 8 on the bush 6 so that by the nature of things it would be able to be rocked in all directions if it were not for the fact that the lever 1 is guided by the gripping body 7 is a given plane that may be changed by adjustment of the gripping body 7 in relation to the bush 6.

Figure 2:
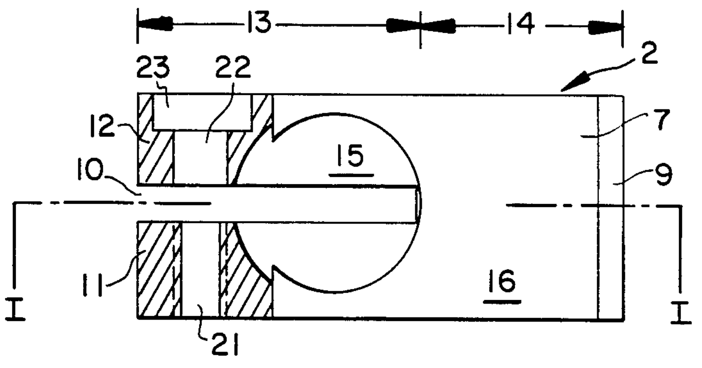
FIG. 2 is a view of the lower face of a gripping body, that is a component of the limit switch, and a part-section taken on the line II—II of FIG. 1.

The design of the gripping body 7 will be seen in some detail in FIG. 2 without the bush 6 and the lever 1. It will be seen that the outside of the gripping body 7 generally has the form of a long parallelepiped with chamfered edges 9 (marked in FIG. 1). It is cut into two gripping jaws 11 and 12 by a slot 10 in the lengthwise middle plane of the body, such slot 10 running therethrough for the full height of the gripping body 7 but only along part of the length thereof. Looked in the length direction it will be seen that the gripping body 7 has a slotted half side 13 and an unslotted half side 14, such slotted half side 13 being made up of the gripping jaws 11 and 12.

In the gripping body 7 there is a cylindrical housing opening 15 so that the body 7 may be mounted on the bush 6. The opening 15 has the form of a blind hole running upwards from the lower side 16 into the mass of the gripping body 7 and having the slot 10 running into it from the left. That is to say, the slot 10 is widened by the opening 15 inside the gripping body 7 so as to be cylindrical. To the right of the left hand limit of the opening 15 there is only a lengthwise slot between the gripping jaws 11 and 12 at the top end 17 of the blind hole. As may be seen from FIG. 1, the lever 1 runs into this part of the slot 10, its other end 18 running out from the top side 17 of the housing 2 to give a useful effect, that is to say the effect of guiding the lever 1 in the length direction of the gripping body 7. The projecting end 18 of the lever 1 makes it clear to the user of the switch what position the lever 1 is in as a sort of indicator or pointer. On the other hand this outwardly running end 18 makes possible hand operation of the driving element, for example for emergency operation of the piston and cylinder actuator.

The gripping body 7 may be mounted by slipping a collar 19 on the bush 6 into the opening 15 and then tightening the gripping jaws 11 and 12 onto the bush 6 by using a screw or clamping member 20 running through the gripping body 7 at a right angle to the slot 10. It will be seen from FIG. 2 that there is a threaded hole 21 in the jaw 11 that takes up screw 20 that runs through a through hole 22 in the other gripping jaw 1, that is to say, the screw is put in place by threading it into the through hole 22 and then turning it for screwing it into the thread in the tapped hole 21. The hole 22 is counter-bored at 23 to take up the head of the screw 20. As may be seen from FIG. 1, the screw 20 is best placed at the same level as the collar 19 on the bush 6 so that a strong and even clamping or gripping force may be produced. The clamping motion of the gripping jaws 11 and 12 in opposite directions is possible in the tightening up process because the material of the gripping body is cut by the slot 10 and may be bent. An important teaching of the invention in this connection is that one and the same slot 10 is used as well for guiding the lever 1 so that the manufacture of the limit switch or detector in keeping with the invention is greatly simplified.

The bush 6 is an axially symmetrical body with an axial hole 24 running through it. The inner or bore face of this hole 24 is in the form of a ball socket 25 in its middle part, that is to say part of the ball joint for the lever 1. A fitting ball head 26 on the lever 1 is taken up in the ball socket 25 and locked in position by a circlip 27. The ball socket 25 has a part-spherical bearing face, that becomes narrower from an equator plane containing the middle point of the ball head 26 towards the collar 19 and the gripping body 7. This makes it possible for the ball head 26 on the lever 1 to be threaded through from the end, furthest from the collar 19, into the ball socket 25. On this side the axial hole 24 is widened out by having a ring-groove 28 in which the circlip 27 is placed. That is to say, the ring-groove undercuts the ball socket 25 where its clearance diameter is greatest so that a circlip placed in the groove 28 will be on the one hand in contact with the floor of the groove 28 and on the other hand placed against the outer face of the ball head 26 to keep it in the ball socket 25. The ball head on the lever 1 is best made up of a diametrically bored ball that may be threaded onto the stem 5 of the lever 1 and be kept in place thereon by friction. This design gives the useful effect of making possible lengthways adjustment of the lever 1, this being important for the adjustment to be in line with the fixed dimensions of any given piston and cylinder actuator. In place of the circlip 27 when a resilient mounting of the lever 1 so as to be resistant to impact is necessary, it is best to use an O-ring of soft elastic material, same then greatly facilitating the assembly of the ball joint 8. Such assembly may be simply effected by slipping the lever 1 with the ball head thereon into the ball socket 25 so that the O-ring may then be put over the end 3 and slipped along the stem 5 of the lever 1 and forced home into the ring-groove 28.

The axial hole 24 in the bush 6 becomes wider on both sides of the ball socket 25 conically outwards. This conical form makes possible a rocking motion of the lever 1 inside the axial hole 24, such motion being limited by the stem 5 coming up against the conical bore face of the axial hole 24. The lever 1 runs through the axial hole 24 into the opening 15 of the gripping body 7 next thereto. This opening 15 takes up the lever 1 and makes certain that same may be rocked to the desired degree. Starting from the outer side 29 of the bush facing away from the gripping body 7 it will be seen that the axial hole 24 firstly has a conically narrowing section joining up with a cylindrical section whose clearance width is somewhat greater than the diameter of the ball head 26. The ring-groove 28 for the circlip 27 is produced in this cylindrical section. Right next to the ring-groove 28 there is the ball head 26, that for its part joins up with a conically widening section of the axial hole 24.

The axial end of the bush 6, on which the gripping body 7 is mounted, is in the from of the collar 19 having a greater diameter than a ring-like groove 30 under it. On the edge of the opening 15 the gripping body 7 has an inwardly running lip 31 mating with the groove 30. This lip 31 runs inwards so far as to decrease the width of the opening 15 at its mouth. The lip 31 is designed to overlap the collar 19 of the bush 6 so that the bush and gripping body 7 are axially locked together. After undoing the screw 20, on the other hand, it becomes possible for the gripping body 7 to be twisted on the bush 6, the ring-like groove 30 then acting as a sort of rail for guiding the lip 31

The other axial end of the bush 6 is designed for mounting the limit switch in keeping with the invention on a piston and cylinder actuator and to make this possible it has fixing means. Preferably the bush 6 has it one axial end placed into an opening in the housing of a piston and cylinder actuator and locked in place by an alined plug-in connector, a bayonet joint or the screw connection to be seen in FIG. 1. In the case of the screw connection the axial end of the bush 6 running out from the gripping body 7 is fashioned as a sleeve with its outer screw thread 32. Between the sleeve and the collar 19 there is radially projecting belt 33, which on the one hand functions as a stop for the gripping body 7 and on the other hand limits the depth to which the screw threaded sleeve may be screwed into a tapped hole in the piston and cylinder actuator. The belt 33 is furthermore designed so that it may be gripped with a tool such as a spanner or wrench and to this end it may be in the form of a hexagonal nut.

As we have seen earlier, the slot 10 in the gripping body 7 runs into the opening 15 in a middle plane so that one half side 13 of the gripping body 7 is cut up into two gripping jaws 11 and 12. In the unslotted half side 14 of the gripping body 7 there is a hole 34 running generally normally in relation to the opening 15 and opening into same. The axis of the hole 34 may take up a switch element that is to be worked by the lever 1. Preferably the hole 34 is tapped at 35 so that the switch element may be screwed thereinto. This system gives the useful effect that that the point at which the lever 1 strikes may be very simply adjusted by screwing the switch element to a greater or lesser degree into the hole 34. For working, the switch element the lever 1 has a second driving head 36, that is preferably in the form of a diametrally bored ball or sphere placed on the stem 5 of the lever 1. The diameter of the driving head 36 is preferably such that it fits through the narrowest part of the ball socket 25. This makes assembly simpler, because the lever 1 may then be plugged into the bush 6 with the driving head 26 inplace on it to put the ball joint 8 together.

The switch element that is to be worked by the driving head 36 may operate in a number of different ways. It would for example be possible for it to be joined to a mechanically driven spool valve whose spool would be moved by the lever 1 so that the flow of fluid to the piston and cylinder actuator would be reversed in direction. It would furthermore be possible for the driving head 36 to act on an electric push button switch which would be placed on a control circuit. As part of a further development of the invention the position of the driving head might be detected inductively or magnetically and then one would have a driving head 36 which was permanently magnetic so that when rocked with and by the lever 1 it would trip a magnetically sensitive detector. On the other hand it would be possible to have a switch element in the form of an electromagnetic oscillator whose radiated energy would be damped by a metal driving head 36 in a given way. It may be said that the invention makes possible a purely mechanical or pneumatic control of the piston and cylinder actuator, whereas on the other hand it is possible to have a further development of known magnetic or inductive proximity switches with the useful effect that the point of proximity detection is at some distance from the said piston and cylinder actuator. This being so, it is then possible for all necessary adjustments to be undertaken very much more easily and it is furthermore possible for the sensitive electrical and electronic components to be better safeguarded against the effects of vibrations and impacts or the like.

In keeping with a preferred form of the invention the rocking motion of the lever 1 is opposed by the force of a return spring 37. As will be seen from FIG. 1 this spring 37 acts by way of a plunger 38 on the stem 5 of the lever 1. In this respect the plunger 38 is mounted in a blind hole 39 in the gripping body 7, such hole running like the hole 34 for the switch element normal to the opening 15. The blind hole 39 is in the unslotted half part 14 of the gripping body 7 and is lined up with the plane of the slot 10. The blind hole 39 runs from the slotted half side 13 of gripping body 7 into same. The slot 10 is for this reason bored at 40 so that there is a hole in it equal in diameter to the diameter of the blind hole 39. The plunger 38 is taken up with a running fit in the blind hole 39 and it is more specially made in the form of a bush with the return spring 37 in its inner space 41. In the assembled condition the spring 37 runs up against the end face 42 of the inner space 41 and at the other end against the floor 43 of the blind hole 39 so as to press the plunger 38 against the lever 1. The end 44 of the plunger 38 running on the lever 1 is rounded to allow for the rolling effect as the lever 1 is rocked in relation to the plunger 38. The rounded end 44 for this reason makes possible an even contact with little wear or friction between the plunger 38 and the lever 1.

An account will now be given of the mounting of the limit switch or sensing devices in keeping with the present invention on a piston and cylinder actuator. Firstly the ball 26 functioning as a pivot ball and the driving heads 4 and 36 are adjusted so that there is the desired distance therebetween. To make this possible it is best if all these parts 26, 4 and 36 are able to be slipped along the stem 5 of the lever 1. A large range of adjustment is further to be had together with a simple adjustment to the most different forms of piston and cylinder actuators if the end 18 of the lever 1 is able to stick out somewhat from the gripping body 7. If however this form of adjustment is not thought to be of any value, it would obviously be possible for the lever 1 with the driving heads 4 and 36 and the ball head 26 to be made in one piece. The lever 1 is mounted in the bush 6 to produce the ball and socket connection or joint 8. Then the bush 6 with or without the piston and cylinder actuator is fixed in place and screwed up as in the working example noted. Because of the presence of the ball and socket joint 8 the plane of rocking of the lever 1 is not so far fixed and in fact it may freely be set at some later stage after the bush 6 has been mounted in its final position. To this end the gripping body 7 is lined up in relation to the collar 19 and then the screw 20 is tightened up. Once the connection between the bush 6 and the gripping body 7 has been made the direction the lever 1 is guided in the slot 10 is fixed. An exact action of the driving head 36 on the switch element is made possible because the hole 34 in which the switch element is placed is in the plane of the slot. The very similar placing of the blind hole 39 for the return spring 37 makes certain on the same lines that the return force acting on the lever 1 is always normal to its direction of rocking. Fine adjustment of the switching point is made possible by changing the depth to which the switch element is screwed into the hole 34.

Taking a general view of the invention it will be seen that it makes possible a very highly adaptable and very compact limit sensing device that is characterized by its very simple structure and simple adjustment. A further useful effect to be noted is that by having the right leverage effect the lever 1 may be used for stepping up or damping the switch operating force and that the switching motion of the driving head 36 is generally parallel to the direction of motion of the guided mass and opposite thereto, this being useful in may switching operations.

I claim:

1. A mechanical limit sensing device for a piston and cylinder actuator, comprising:

a housing consisting essentially of a bearing sleeve adapted to be fixed to a cylinder of a piston and cylinder actuator, and a clamping body fixed at a variable rotational position to said bearing sleeve;

said bearing sleeve having an outer annular bearing collar engaged with said clamping body, an inner ball socket, an axial opening extending through said sleeve and through said ball socket having opposite truncated conical portions widening outwardly away from said ball socket, said bearing sleeve further including an outer end with an outer male thread adapted to be fixed to a cylinder of a cylinder and piston actuator, spaced away from said collar and away from said clamping body, said outer male thread being coaxial with said axial opening;

said clamping body having a slot therein with a cylindrical opening for receiving said collar, said slot dividing one end of said clamping body into two clamping jaws, said collar being disposed between said clamping jaws;

a clamping member connected between said clamping jaws for urging said clamping jaws together for fixing said clamping body to said bearing sleeve; and a rocking lever extending through said sleeve and having a ball pivotally mounted to said ball socket of said sleeve for pivoting of said lever on said sleeve, said rocking lever having a first end extending outwardly from said sleeve in a direction away from said clamping jaw and an opposite end extending outwardly from said sleeve and through said slot, said slot being shaped to guide a pivotal movement of said opposite end of said lever, said one end of said lever being adapted to be engaged and pushed by movement of part of a piston and cylinder actuator and said opposite end of said lever being adapted to influence a switching element with pivoting said lever;

said clamping body including a portion from which said slot and said jaws extend, said portion of said clamping body including a bore therein lying in a plane of said slot and extending perpendicularly to said axial opening of said bearing sleeve, said slot including an enlarged opening communicating with said bore and into which said opposite end of said lever extends and is movable, said bore of said clamping body having a female thread therein for receiving a switching element.

2. A device according to claim 1, wherein said portion of said body includes a second bore spaced from said first mentioned bore, a plunger slidably mounted in said second bore and engaged against said opposite end of said lever, and a spring biasing said plunger toward said lever.

3. A device according to claim 1, wherein said clamping body includes a middle plane, said slot being centered on said middle plane, said clamping body including an enlarged opening in said slot, said enlarged opening defining a seat for said annular bearing collar of said bearing sleeve, said bearing sleeve including a ring like groove for receiving an annular lip of said clamping body.

4. A device according to claim 1, wherein said opposite end of said lever extends through and beyond said slot.

5. A device according to claim 1, including a holding ring connected in said sleeve adjacent said ball socket for retaining said ball of said lever in said ball socket.

6. A device according to claim 1, wherein said bearing collar includes a radially projecting annular belt for engagement by a tool to rotate said sleeve, disposed between said collar and said outer portion of said sleeve which is adapted for connection to a cylinder of a piston and cylinder actuator.

7. A device according to claim 1, including a first ball-like drive head on said one end of said lever and a second ball-like drive head on the opposite end of said lever, each ball head being fixed at an adjustable location along said lever.

* * * * *